Jan. 1, 1963 Z. M. SURLETTA 3,071,168
CUTTING AND BENDING DIES FOR SPRING STRIP
Filed March 18, 1958 2 Sheets-Sheet 1
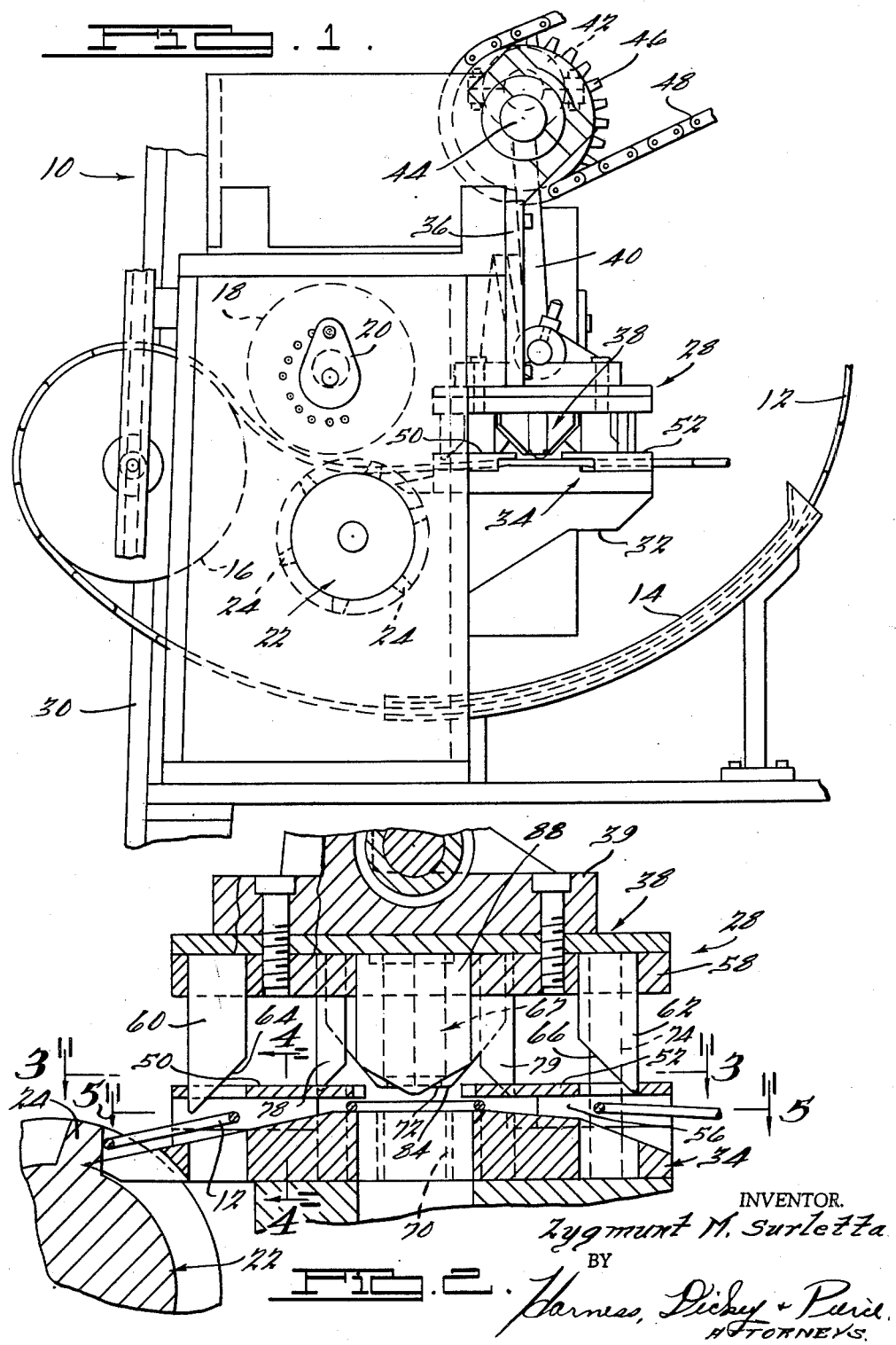
INVENTOR.
Zygmunt M. Surletta
BY
Harness, Dickey & Pierce
ATTORNEYS.

Jan. 1, 1963         Z. M. SURLETTA         3,071,168
CUTTING AND BENDING DIES FOR SPRING STRIP
Filed March 18, 1958                2 Sheets-Sheet 2
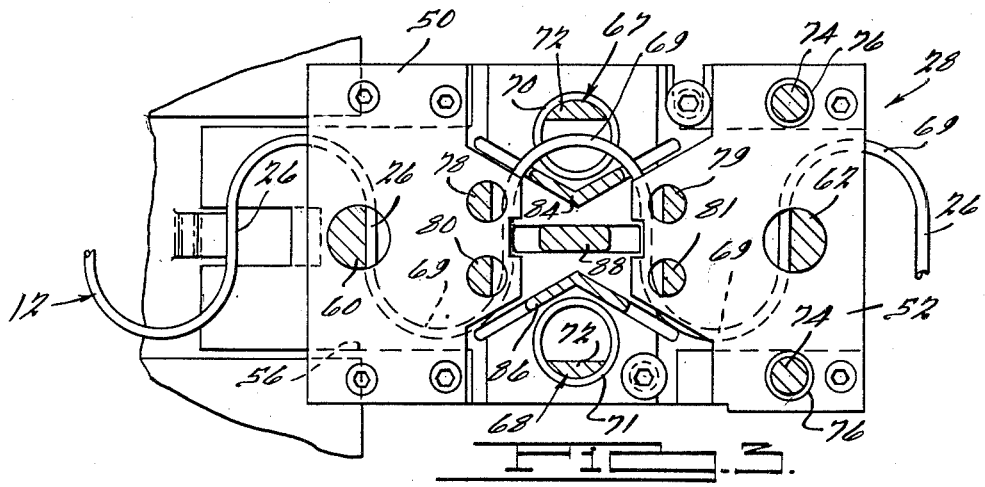
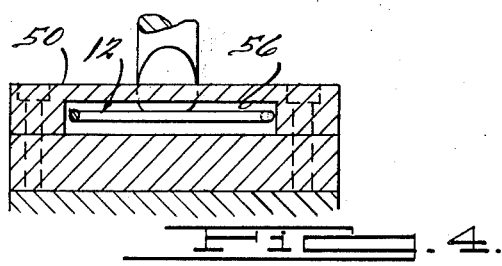
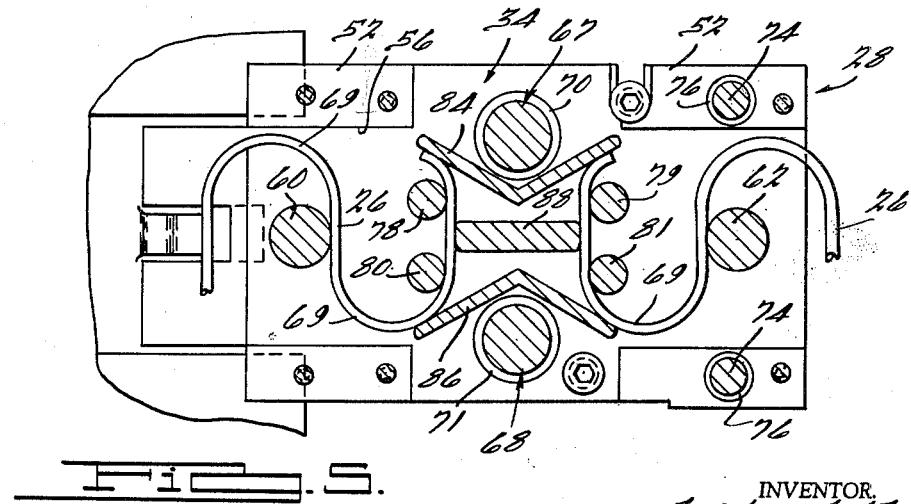
INVENTOR.
Zygmunt M. Surletta
BY
Harness, Dickey & Pierce
ATTORNEYS.

United States Patent Office 3,071,168
Patented Jan. 1, 1963

3,071,168
CUTTING AND BENDING DIES FOR
SPRING STRIP
Zygmunt M. Surletta, Detroit, Mich., assignor to No-Sag
Spring Company, Warren, Mich., a corporation of
Michigan
Filed Mar. 18, 1958, Ser. No. 722,307
4 Claims. (Cl. 140—90)

This invention relates to an improved die assembly for cutting sinuous spring elements of the type having straight transverse portions interconnected by alternately oppositely facing loop portions, and more particularly to an improved cut-off and end-forming die assembly arranged to operate on the loop portions along both laterally opposite sides of sinuous spring elements of this type.

The dies of the present invention include symmetrically arranged cutting and end-forming elements, identical die elements being positioned along laterally opposite sides of a guideway through which the sinuous spring stock is passed in operation. The stock is fed intermittently through the guideway, and actuation of the dies is controlled through a counting device so that after a predetermined number of intermittent advances the dies are operated to cut the spring loop portion positioned at a predetermined point within the guideway and to form the cut ends of the spring to a predetermined shape. Each intermittent advance of the spring stock through the guideway is substantially equal to the spacing between successive ones of the transverse straight portions of the spring so that oppositely facing loop portions are brought alternately into cutting position in the guideway. In the present arrangement, the dies cut and form the ends of whichever loop portion happens to be in the cutting position at the time the dies are actuated.

The die assembly of the invention includes holding members for accurately positioning the stock, cutting members for cutting off portions of the loops, and end-forming members for bending the cut ends of the stock to predetermined shape.

Accordingly, the principal objects of the present invention are: to provide an improved cut-off and end-forming die assembly for sinuous spring stock; to provide an improved die assembly of this character having oppositely disposed cutting and end-forming elements for cutting loops on both sides of sinuous spring stock and for forming the cut ends of the stock; to provide an improved die assembly for cutting off and forming the cut ends of sinuous spring stock including guide means for guiding the stock along a predetermined path, first cutting and forming elements for cutting out part of the loop portions of the stock along one side of the path and for forming the cut ends of the stock, second cutting and forming elements for cutting out and forming the cut ends of loop portions along the laterally opposite side of the path, and positioning means cooperative with both the first and the second cutting and forming elements for accurately positioning and holding the stock for the cutting and end-forming operations; and in general to provide an improved die assembly of the aforementioned type which is of relatively simple and rugged construction, accurate in operation, and inexpensive to manufacture.

These and other objects and advantages of the invention will become apparent in the following detailed description of a preferred embodiment thereof taken together with the drawings wherein:

FIGURE 1 is a fragmentary front elevational view of a wire forming machine of the type used in the manufacture of sinuous spring elements, and particularly shows the portion of the machine wherein the sinuous spring stock is cut to length to form separate spring elements;

FIG. 2 is a longitudinal sectional view of the die assembly of the machine shown in FIG. 1;
FIG. 3 is a horizontal section taken along the section line 3—3 of FIG. 2;
FIG. 4 is a cross section taken along the section line 4—4 of FIG. 2; and
FIG. 5 is a horizontal section taken along the section line 5—5 of FIG. 2.

The die assembly of the present invention, although not limited exclusively thereto is particularly adapted for use with machines of the type shown in the Horton patents, Nos. 2,160,020 and 2,188,406, and also with the machine disclosed in the copending application of Frank J. Horton, filed March 28, 1958, Serial No. 722,306, now Patent No. 2,998,045, dated August 29, 1961, and entitled, "Spring Forming and Cut-off Machine." In machines of this type, straight wire spring stock is bent into sinuous form to form sinuous spring elements having transversely extending straight portions interconnected by alternately oppositely facing loop portions, the whole being given a longitudinal curvature, or arch.

Referring first to FIG. 1, a machine of this type generally includes a cut-off section 10, which operates in timed relationship to the forming section of the machine (not shown) and into which the sinuous wire stock 12 is fed along a guideway 14. The stock 12 passes between a pair of adjustable re-forming wheels 16 and 18 which bend the stock 12 longitudinally to impart a desired longitudinal curvature to it. The first forming wheel 16 is vertically adjustable, and the second forming wheel 18 is mounted on an adjustable eccentric device 20, so that by adjusting the relative positions of the two wheels 16 and 18, the longitudinal curvature imparted to the stock 12 may be controllably varied within relatively wide limits. The stock 12 is driven through this section 10 of the machine by a sprocket drive wheel 22, the teeth 24 of which fit between the spaced transverse straight portions 26 (FIG. 3) of the stock 12. The drive wheel 22 is intermittently driven synchronously with the loop forming portion of the machine. It pulls the stock 12 through the re-forming wheels 16 and 18 and drives it through the die assembly 28 where the stock is cut to length to provide individual spring elements.

The die assembly 28 is rigidly supported on the main machine frame 30, as upon the supporting bracket 32, illustrated, to which the lower, stationary die 34 is fixed. The movable die 38 is fixed to a slide 39 which is vertically reciprocatable in a guideway 36, and which is pivotally supported at the lower end of a connecting rod 40. The upper end of the connecting rod 40 is rotatably mounted on an eccentric 42 fixed upon a shaft 44. The machine includes a clutch mechanism (not shown herein) by which the shaft 44 is intermittently connected at controlled intervals to a sprocket 46, which is continuously driven by the chain 48.

The clutch mechanism is actuated by a timer device (not shown) and, when actuated, it couples the sprocket 46 to the shaft 44 for a single revolution thereof, during which the movable die 38 is driven through one complete operating cycle. The timer is arranged to count the incremental advances of the spring stock 12 through the machine, each advance being equal to the spacing on centers between successive ones of the transverse straight portions 26 of the stock. The timer may be arranged to actuate the clutch after any desired number of incremental advances, thereby to cut spring elements of a length equal to any desired number of spacings between the transverse portions 26 of the stock.

With this understanding of the over-all operation of the machine and the manner in which sinuous spring elements are made, a more detailed description of the die assembly 28 itself will be given.

Referring now to FIGS. 2-5, the die assembly 28 includes a fixed female die 34, which is appropriately bored to receive the male members of the movable die 38, and which is firmly fixed upon the bracket 32. A pair of flanged cover plates 50 and 52 are secured to the female die 34 at opposite ends thereof and define, in conjunction therewith, an enclosed guideway 56 through which the stock 12 is fed during operation. The movable die 38 includes a base plate 58 which is bolted or otherwise rigidly secured to the slide 39 and upon which the operative male members of the die are mounted.

The male elements include a pair of vertical end members 60 and 62 for positioning the stock 12 longitudinally and holding it while it is being cut and the ends reversely bent by the spreaders 84 and 86, hereinafter described. The members 60 and 62 are provided with inwardly facing oblique faces 64 and 66 and are moved downwardly with the spreaders 84 and 86 to retain the end straight portions 26 of the spring strip in parallel relation to the other straight portions. When the die is actuated, the end members 60 and 62 engage the outermost ones of the four transverse spring portions 26 within the guideway 56, and by the camming action of their oblique faces 64 and 66 force them slightly together, firmly positioning the stock 12 longitudinally within the guideway 56 and holding the stock while it is cut and end-formed.

The stock 12 is cut by one of two punches 67 and 68, which are carried by the plate 58 and positioned on opposite sides of the guideway 56 so that depending on the position of the stock longitudinally in the guideway, one or the other of the successive oppositely facing loop portions 69 will be cut by the correspondingly positioned punch 67 or 68. The punches 67 and 68 are received within hardened steel bushings 70 and 71 fitted within the fixed die 34. The inner edges of the bushings 70 and 71 are cutting edges and cooperate with the outer edges of the punches 67 and 68, respectively, to shear the stock. The punches have projecting nose portions 72 arranged to enter the bushings 70 and 71 before the cutting edges of the punches strike the stock, and to guide the punches accurately into the bushings on the downward stroke of the die.

The movable die 38 is held in accurate register with the fixed die 34 by a pair of guide pins 74 which are fixed on the plate 58 and extend downwardly through lubricated bushings 76 fitted in the fixed die 34. The guide pins 74 are longer than the stroke of the movable die 38 and remain engaged within the bushings 76 at all times. The pins 74 are spaced outwardly from the guideway 56 so they do not interfere with the travel of the stock 12.

Four anvil pins 78, 79, 80 and 81 are fixed in the plate 58 and arranged in rectangular fashion for engaging the two central transverse portions 26 of the stock. After the stock is cut, the free ends are bent around the anvil pins 78-81 by one or the other of two laterally spaced spreaders 84 and 86, which are V-shaped in horizontal section and are fixed on the plate 58 laterally inwardly of the punches 67 and 68. A central holding member 88 of rectangular horizontal section is fixed to the plate 58 between the spreaders 84 and 86. The holding member 88 cooperates with the anvil pins 78-81 to hold the central transverse portions 26 of the stock straight and to prevent bowing thereof while the ends are bent around the anvil pins 78 and 79, or 80 and 81.

The shape and arrangement of the spreaders 84 and 86 is particularly advantageous in the practice of the present invention. While one of the spreaders such as the spreader 84, as shown in FIG. 4, is bending the cut ends of the stock, the opposite spreader 86 supports the immediately adjacent loop portions 69, holding the stock against lateral escape despite the lateral force exerted by the first spreader 84.

The arrangement is symmetrical with respect to the main longitudinal axis of the guideway 56. If the die 34 is actuated when the stock 12 is in the position illustrated in FIG. 3, for example, the punch 67 does the cutting, and the spreader 84 end-forms the stock. If the stock 12 is advanced one increment, or any odd number of increments from the position shown in FIG. 3, the opposite punch 68 does the cutting, and the other spreader 86 end-forms the stock while the first spreader 84 provides lateral backing support for the stock.

As described in the Horton patent, No. 2,188,406, the actuation of the clutch is initiated during the intermittent advance of the stock 12, that is, while the sprocket wheel 22 is in rotation. The advance, however, is completed and the stock 12 is at rest by the time the movable die 38 contacts the stock 12. As the die 38 descends, the two end members 60 and 62 make the initial contact with the stock, engaging the two outermost ones of the four straight portions 26 within the guideway 56, and centering one of the loop portions 69 beneath one of the punches 67 and 68. (The anvil pins 78-81 are also provided with oblique inwardly facing bottom surfaces, but they normally engage the stock only after it has been positioned by the end members 60 and 62.) As the die 38 proceeds further downwardly, the punch 67 or 68 cuts out a central part of the loop portion 69, which part falls through the bushing 70 or 71 and is discarded.

As the die 38 continues further downwardly, the cylindrical portions of the anvil pins 78-81 extend past the stock 12, and the central member 88 comes into contact with the central ones of the straight spring portions 26, urging them firmly against the anvil pins 78-81. Thereafter, the spreader 84 or 86 engages and bends the ends of the stock (as best shown in FIG. 5) around the adjacent anvil pins 78 and 79 or 80 and 81. During this bending of the end portions of the stock, the spreader 86 or 84 opposite from the one doing the bending provides lateral support for the stock, holding it against sidewise movement in the guideway 56. In FIG. 5, the die assembly 28 is illustrated in its fully closed, or actuated position, half way through one operating cycle. The movable die 38 then immediately moves upwardly again to its fully retracted position and remains raised until the clutch is again actuated.

In the die assembly of the present invention, the loop portions 69 at either side of the stock may be cut and end-formed, thus permitting cutting of spring elements having odd numbers of straight portions, and without the need for separate end forming means. In the machine shown in the Horton patent, No. 2,160,020, for example, the die is arranged to cut off and end-form only along one side of the stock, so that length selection of the spring elements is limited to spring elements having even numbers of the transverse portions 26. With the die assembly of the present invention, length selection of the cut and end-formed spring elements may be made on the basis of a single spacing unit, that is, of the spacing between two adjacent ones of the transverse portions 26.

What is claimed is:

1. A die assembly for cutting off and end-forming sinuous spring stock having transverse straight portions and alternately oppositely facing loop portions, said assembly comprising means defining an enclosed guideway for guiding a sinuous spring strip along a predetermined longitudinal path, a movable die member for support above said path and for travel downwardly thereacross, said movable member including downwardly projecting holding elements which engage a plurality of straight portions of the stock, cutting elements and end-forming elements for engaging the stock outwardly of said straight portions and symmetrically arranged on opposite sides of the central longitudinal axis of said path, and a fixed die member constituting the floor of said guideway and being apertured to receive said elements during the downward travel of said movable die member, one said end forming element abutting adjacent loops on one side of the spring stock while the other end forming element is bending the severed ends of the loop therebetween at the opposite side of the spring stock.

2. A die assembly for cutting off and end-forming sinuous wire spring strip having a central longitudinal axis and of the type having alternate loop portions and transverse straight portions comprising male and female dies, the male die having cut-off and end-forming elements symmetrically arranged on opposite sides of the central longitudinal axis when the strip is disposed in the die assembly and so disposed that when on end-forming element is bending the cut ends of the severed loops at the ends of the straight portions, the other end forming element engages the loops at the opposite ends of the straight portions and retains the spring strip against lateral displacement.

3. A die assembly for cutting off and end-forming sinuous wire spring strip having a central longitudinal axis and of the type having alternate loop portions and transverse straight portions comprising male and female dies, the male die having cut-off and end-forming members symmetrically arranged on opposite sides of the central longitudinal axis when the strip is disposed in the die assembly, two laterally opposite ones of said members being shaped to have one function as a bending member when the other functions as a lateral support member for retaining the severed ends of the spring strip against lateral displacement while they are being end-formed by the first said bending member, and holding elements engaging the straight portions of the spring strip next adjacent to the straight portions thereof having ends which are being bent.

4. A die assembly for cutting off and end-forming sinuous wire spring strip of the type having alternate loop portions and transverse straight portions comprising means defining a guideway for guiding a sinuous spring strip along a predetermined longitudinal path, a die having longitudinal positioning members for positioning the transverse portions of a spring strip in said guideway at predetermined positions therein, a pair of cut-off punches on said die laterally spaced apart on opposite sides of said guideway and positioned longitudinally therealong for cutting off a part of a loop of a spring strip positioned in said guideway by said positioning members, said punches being arranged directly opposite from each other for cutting loops along the opposite edges of a spring strip so positioned in said guideway, a pair of bending members on said die positioned adjacent to and laterally inwardly of said punches for forming the cut end portions of the severed loop after it has been cut off by one of said punches, anvil members on said die for supporting said cut end portions while they are being formed by said bending members, said bending members being so shaped as to have one support the cut end portions against lateral displacement in said guideway while they are being end-formed by the other bending member, holding elements engaging the straight portions of the spring strip adjacent to the straight portions thereof having ends which are being bent, and an apertured die cooperating with said first die.

References Cited in the file of this patent
UNITED STATES PATENTS

| Re. 23,169 | Horton | Nov. 22, 1949 |
| 2,188,407 | Horton | Jan. 30, 1940 |
| 2,645,252 | Norman | July 14, 1953 |